(12) United States Patent
Yager (10) Patent No.: US 6,539,909 B2
(45) Date of Patent: Apr. 1, 2003

(54) RETRACTABLE SEAT VALVE AND METHOD FOR SELECTIVE GAS FLOW CONTROL IN A COMBUSTION CHAMBER

(75) Inventor: James H. Yager, Saint Charles, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/848,516

(22) Filed: May 3, 2001

(65) Prior Publication Data

US 2002/0162526 A1 Nov. 7, 2002

(51) Int. Cl.[7] .................................................. F02N 3/00
(52) U.S. Cl. ................... 123/188.8; 123/188.2
(58) Field of Search ..................... 123/188.8, 188.2, 123/188.3

(56) References Cited

U.S. PATENT DOCUMENTS

| 4,261,307 | A | 4/1981 | Oldberg |
| 5,107,802 | A | 4/1992 | Yagi et al. |
| 5,205,247 | A | 4/1993 | Hoffman |
| 5,253,620 | A | 10/1993 | Dohn et al. |
| 5,501,186 | A | 3/1996 | Hara et al. |
| 5,651,336 | A | 7/1997 | Rygiel et al. |
| 5,899,180 | A | 5/1999 | Fischer |
| 5,937,809 | A | 8/1999 | Pierik et al. |
| 5,957,106 | A | 9/1999 | Maloney et al. |
| 6,019,076 | A | 2/2000 | Pierik et al. |
| 6,062,535 | A | 5/2000 | Ruth et al. |

FOREIGN PATENT DOCUMENTS

GB         2033960     *  5/1980   ............. F16K/1/54

* cited by examiner

Primary Examiner—Tony M. Argenbright
Assistant Examiner—Katrina B. Harris
(74) Attorney, Agent, or Firm—Dennis Kelly Sullivan; Jeffrey P. Calfa; Neil T. Powell (57) ABSTRACT

The present invention provides an apparatus and method for selective control of gas flow in a combustion chamber in an internal combustion engine through a moveable or retractable seat valve that is independent of piston position. The retractable seat valve has complete freedom of valving events such that gas flow can be selectively controlled at any time during the engine cycle, or throughout the engine cycle. Further, the retractable seat valve is scalable for adaptation to internal combustions engines of various bore sizes. The retractable seat valve includes a retractable seat, a stationary seat, a retractable seat actuator member, a pin connector for translation of retractable seat actuator member movement to the retractable seat, and a valve actuator assembly that allows the retractable seat valve be selectively positioned in the cylinder head in a closed position, open position or anywhere therebetween.

53 Claims, 8 Drawing Sheets

RETRACTABLE SEAT VALVE AND METHOD FOR SELECTIVE GAS FLOW CONTROL IN A COMBUSTION CHAMBER

FIELD OF THE INVENTION

The present invention relates generally to valve assemblies for engine cylinders in an internal combustion engine, and more particularly to a moveable valve seat assembly that allows for selective gas flow control in a combustion chamber that is independent of piston position.

BACKGROUND OF THE INVENTION

Existing internal combustion engines typically employ intake and exhaust poppet valves to regulate the gas flow to and from corresponding combustion chambers of an engine cylinder. The movement of the poppet valves may be carried out via traditional camshaft actuation means which depend on piston position, or by more recent camless approaches, which also depend on piston position.

In a typical engine, intake and exhaust poppet valves reciprocate into the combustion chamber to provide gas flow in preparation for combustion or to release exhaust gas after combustion. Generally, the poppet valves open by moving into the combustion chamber. The movement of the poppet valves is controlled by mechanical, electrical or hydraulic means. The poppet valve movement is timed to avoid contact with the reciprocating piston moving within the piston cylinder.

These methods, while workable, have drawbacks such as the possibility of valve-to-piston contact. Mistiming the opening of the poppet valves can lead to catastrophic valve-to-piston contact, which could destroy the engine. Thus, current poppet valve actuation designs are very sensitive to piston position. Also, the poppet valve is typically subjected to differential pressures on each side of the poppet valve. The poppet valve must overcome combustion chamber pressure or cylinder pressure to open into the combustion chamber. This requires large amounts of power to operate the valve train system, which opens the valves, to overcome cylinder pressure forces that are tending to oppose the opening of the valves. This results in high valve train system parasitic horsepower losses, which in turn lead to reduced engine efficiency and overall performance.

There is therefore a need for an apparatus and method that will allow for combustion chamber gas or air flow in a manner that is independent of piston position, thereby eliminating the potential valve-to-piston contact, and that substantially reduces power requirements to carryout gas flow to and from the combustion chamber, thereby resulting in improved engine efficiency and performance.

SUMMARY OF THE INVENTION

The present invention provides an apparatus and method for the selective control of gas flow to and/or from a combustion chamber through a moveable or retractable seat valve that is independent of piston position. The moveable or retractable seat valve eliminates the possibility of conventional valve-to-piston contact which results in complete freedom of valving events such that gas flow can be selectively initiated at any time during the engine cycle, or throughout the engine cycle if desired. Further, the moveable or retractable seat valve of the present invention is scalable and thus readily adaptable to internal combustions engines of various bore sizes. Also, the retractable seat valve is applicable in internal combustion engine applications that use diesel or gasoline as the primary fuel, or other alternative fuels, e.g. propane, methanol, compressed natural gas (CNG), etc.

In accordance with the present invention, there is provided a moveable or retractable seat valve (RSV) mechanism for controlling gas flow to and from a combustion chamber of an internal combustion engine that is used in conjunction with a cylinder head, a gas port, and a gas port opening into the combustion chamber. The retractable seat valve comprises a stationary seat disposed adjacent to or between the gas port opening to the combustion chamber. The stationary seat comprises a body portion that extends partially across the gas port opening and has a peripheral edge.

There is also a retractable seat disposed in the gas port. The retractable seat is selectively controlled for movement between an open position and a closed position in the gas the port. In the open position, the retractable seat allows gas flow between the gas port and the combustion chamber around the peripheral edge of the stationary seat. In the second closed position, the retractable seat is disposed in a sealing relationship with the peripheral edge of the stationary seat thereby preventing gas flow between the gas port and the combustion chamber.

The movement of the retractable seat may be selectively controlled by any of the well known techniques and devices available to those of skill in the art for controlling the movement of conventional poppet valves in camless applications or injection in electronic fuel injectors. These can include any combination of hydraulic, solenoid, electrical or mechanical means that may be selectively controlled by an engine electronic control module (ECM).

In accordance with the present invention, there is also provided a method for controlling gas flow in a combustion chamber of an internal combustion engine. The method comprises generating a command to actuate a moveable or retractable seat from an electronic control module; operating a valve actuator assembly and moving a seat valve actuator member; translating the movement of the seat valve actuator member to a retractable seat to move the retractable seat to a selected position between an open and closed position; and forming a gas passage between a retractable seat seating face and a stationary seat seating surface such that gas can flow in a controlled manner in the combustion chamber.

The following drawings and description set forth additional advantages and benefits of the invention. Other advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE PREFERRED EMBODIMENTS

Figure 1:
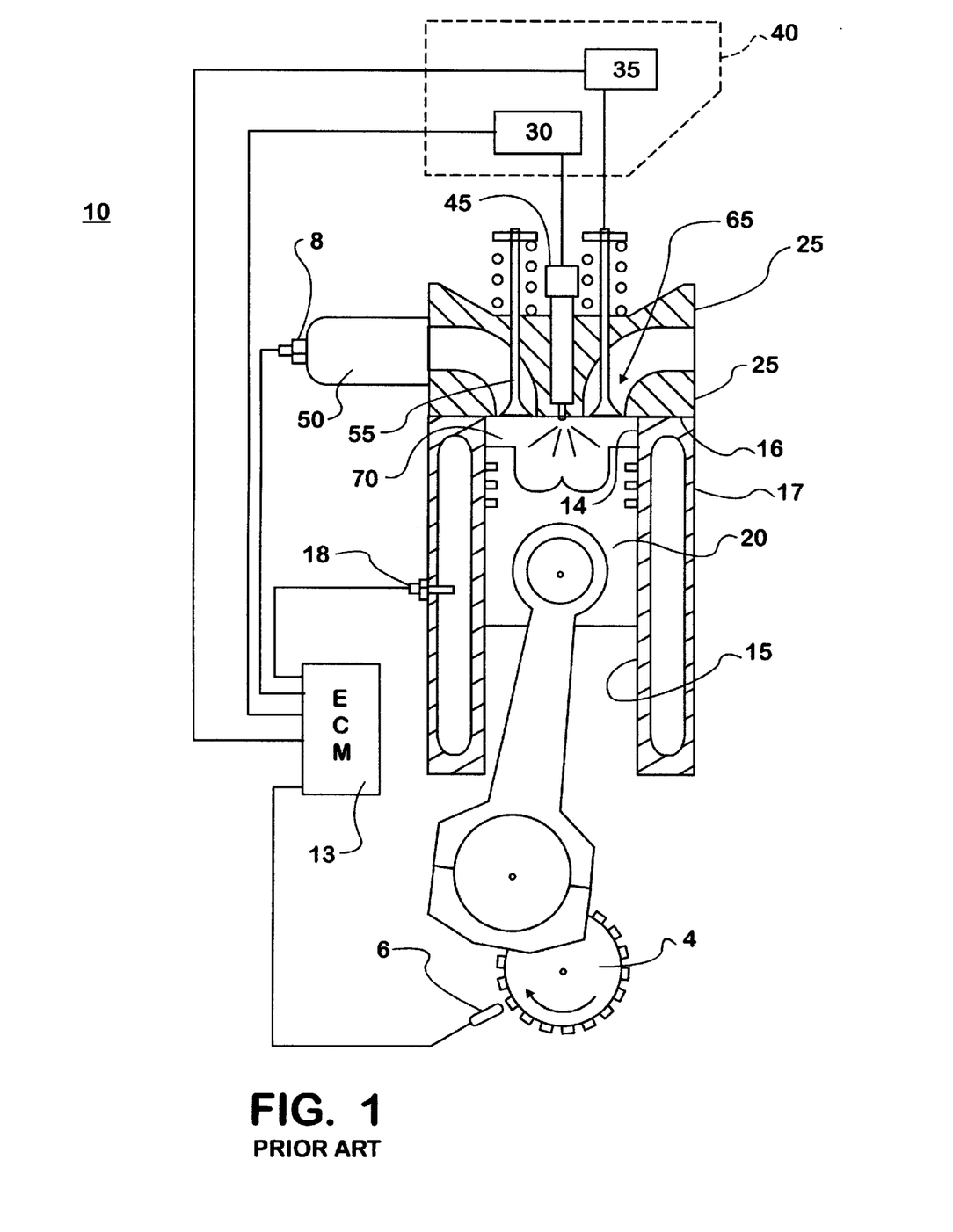
FIG. 1 illustrates general components associated with a typical prior art internal combustion engine.

FIG. 1 generally illustrates a typical four-stroke internal combustion diesel engine 10. The engine 10 includes a block 17 with a plurality of engine cylinders 15 and a top engine block mounting surface 16. The engine 10 also has a cylinder head 25 seated on the top engine block mounting surface 16 and rigidly attached by a plurality of fasteners (not shown). The internal combustion engine 10 has a plurality of engine cylinders 15, each with a corresponding reciprocating piston 20 therein for driving a crankshaft 4. The crankshaft 4 is rotatively supported in the engine block 17. The reciprocating piston 20 makes a compression stroke where the piston travels upward in the cylinder 15 toward a cylinder head 25; and a power stroke where the piston travels down away from the cylinder head 25 in the engine cylinder 15. A combustion chamber 70 is formed between the cylinder head 25, the engine cylinder interior wall 14, and the piston 20.

The engine 10 is typically equipped with an electronic control module (ECM) 13 programmed to control the operation of the engine 10. The ECM 13 typically senses various parameters, including, among others, a pressure sensor 6 which senses the pressure in an intake manifold 50, and an engine speed sensor 6, which senses the speed of the crankshaft 4 and its rotational position. The ECM 13 typically controls, among other components, the fuel injection system 30 in response to a plurality of sensor data. FIG. 1 shows the ECM 16 connected to a fuel injector 45 that corresponds to a particular engine cylinder 15, which controls the timing and amount of fuel injected into the combustion chamber 70.

In a camless application, the ECM 13 will generally control intake/exhaust valve actuator assemblies 35 in response to a plurality of engine sensors 8. The ECM 13 operates the intake and exhaust valves 55 and 65 and the fuel injector 45 to produce optimum timing events of valve opening and closing, and fuel injection in a variety of operating conditions. The engine 10 could be provided with a hydraulically-operated, electronically-controlled unit injector fuel system 30 of the type discussed and illustrated in U.S. Pat. No. 5,245,970 to Iwaszkiewicz et al. The engine 10 could also be provided with a hydraulically-operated, electronically-controlled intake/exhaust valve actuator assembly 35 of the type discussed and illustrated in U.S. Pat. Nos. 5,960,753; 5,713,316; 5,640,987; and 5,638,781 all to Sturman. Alternatively, the engine 10 could also be provided with a control module 40 for electronically controlling hydraulically-actuated intake/exhaust valves 55 and 65 and fuel injectors 45 as discussed and illustrated in U.S. Pat. No. 5,970,956 to Sturman. These patents are herein incorporated by reference.

In the case where the control module 40 controls camless hydraulically driven intake and exhaust valves 55 and 65 and a hydraulically driven fuel injector 45, as discussed in U.S. Pat. No. 5,970,956, the control module 40 contains a valve assembly 35 to control the intake/exhaust valves 55 and 65, and a valve assembly 30 to control actuation of the fuel injector 45. The valve assemblies 30 and 35 could each contain a pair of solenoid actuated two-way spool valves (not shown). Solenoid actuated three-way or four-way spool valves could instead be used depending on the particular application involved. The solenoids (not shown) are actuated by digital pulses provided by an electronic assembly within the control module 30 and 35. The digital pulses are typically dependent on control signals from the ECM 13.

Figure 2:
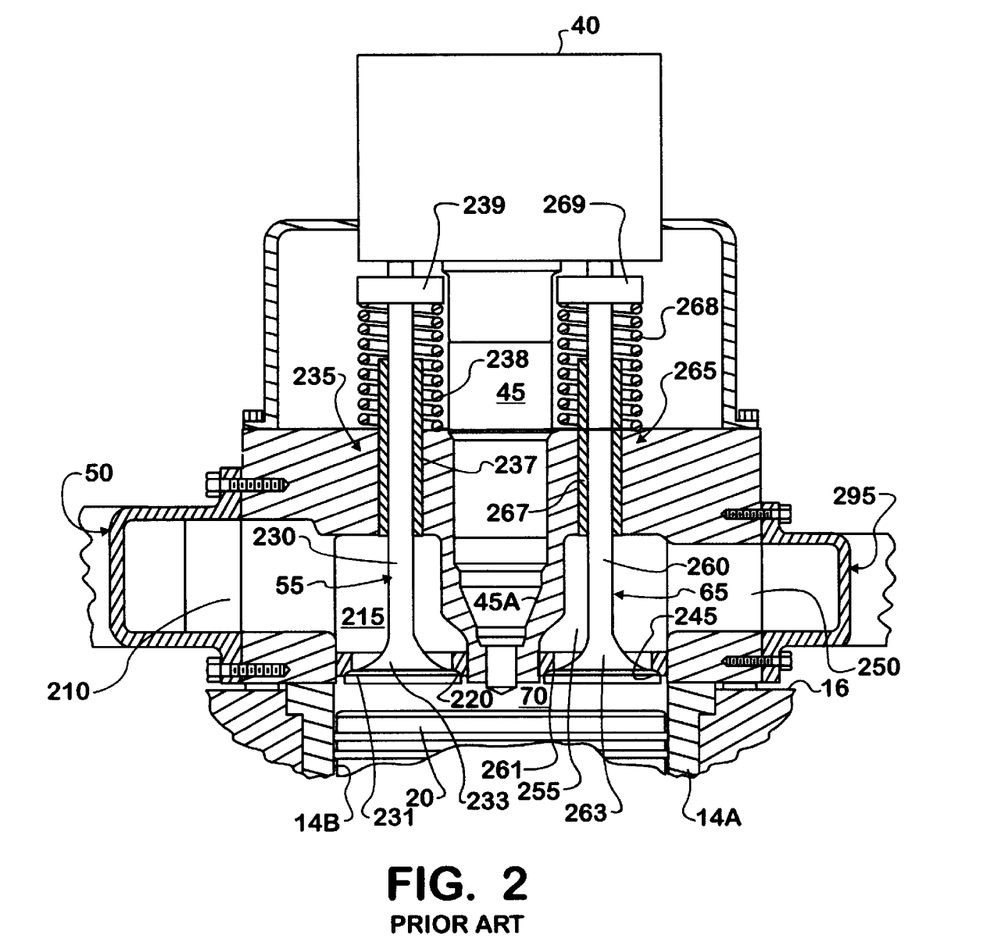
FIG. 2 illustrates components typically associated with a prior art engine cylinder of the internal combustion engine shown in FIG. 1.

FIG. 2 illustrates, in more detail, the cylinder head 25, intake/exhaust valve 55 and 65, combustion chamber 70, and piston 20 area of FIG. 1. The cylinder head 25 has an intake port 210 and an exhaust port 250 that corresponds to a particular combustion chamber 70. The intake port 210 extends to a bottom intake port opening 215 adjacent to the combustion chamber 70. The exhaust port 250 extends a bottom exhaust port opening 255 also adjacent to the combustion chamber 70. Also shown is a fuel injector 45 for the combustion chamber 70, which is disposed in a stepped injector bore 45A in the cylinder head 25. The fuel injector 45 includes a hydraulically-operated electronically controlled fuel injector operating system 40. Also shown are typical prior art intake and exhaust poppet valves 55 and 65 that are activated to allow the flow of gas or air to and from the combustion chamber 70. For example, as discussed and illustrated in U.S. Pat. Nos. 5,634,447 to Rowells, and 5,271,229 to Clarke et al., both herein incorporated by reference.

The intake poppet valve 55 is operatively mounted in the cylinder head 25 and covers the bottom intake port opening 215 in a closed or sealed position. The exhaust poppet valve 65 is operatively mounted in the cylinder head 25 and covers a bottom exhaust port opening 255 in a closed position. Those of skill in the art will readily recognize that there could be multiple intake poppet valves 55 and intake valve supports 235, as well as multiple exhaust valves 65 and exhaust poppet valve supports 265.

The operation of the intake and exhaust valves 55 and 65 is well known. For example, the intake valve 55 typically moves into the combustion chamber 70 to allow gas flow via the intake port 210 into the combustion chamber 70. While the exhaust valve 65 is typically moved downward into the combustion chamber 70, during an exhaust stroke, as the piston 20 is moving in upward toward the exhaust valve 65, thereby allowing gas flow out from the combustion chamber 70 to the exhaust port 250 and on to an exhaust manifold 295.

The valve movement requires that the intake and exhaust valves 55 and 65 open into the combustion chamber 70 which requires that the valves 55 and 65 overcome high combustion chamber pressures. The high chamber combustion pressures tend to oppose the opening of the valve 55 and 65. As a result, large forces and large amounts of power are required to overcome the high combustion chamber pressures leading to high parasitic horsepower (HP) losses which adversely affects the efficiency and performance of an internal combustion engine. Moreover, the opening timing of the poppet valves 55 and 65 in existing engines is typically limited by their dependent relationship with piston 20 position.

Figure 3A:
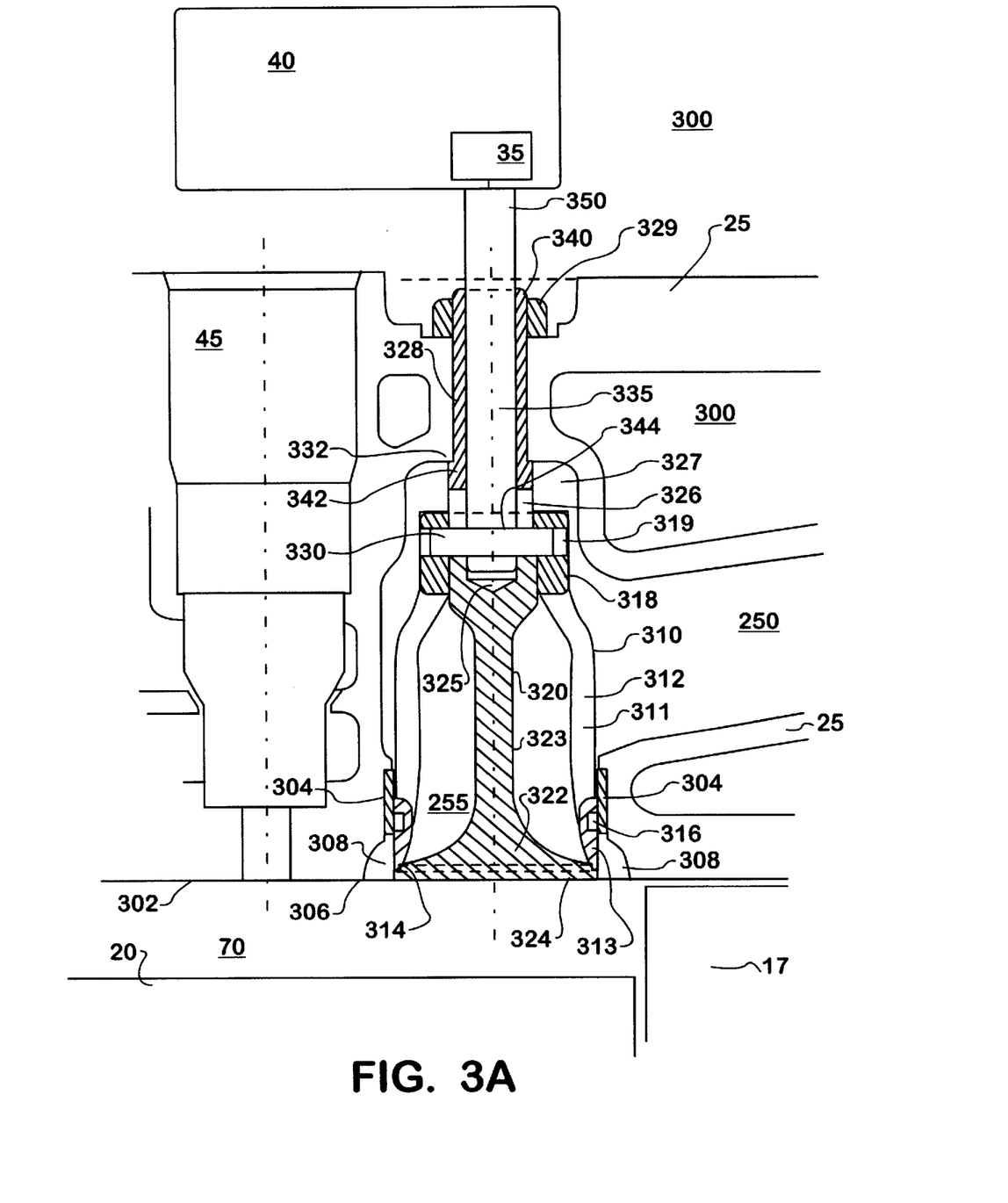
FIG. 3A illustrates an embodiment of a moveable or retractable seat valve mechanism according with the present invention.
Figure 5:
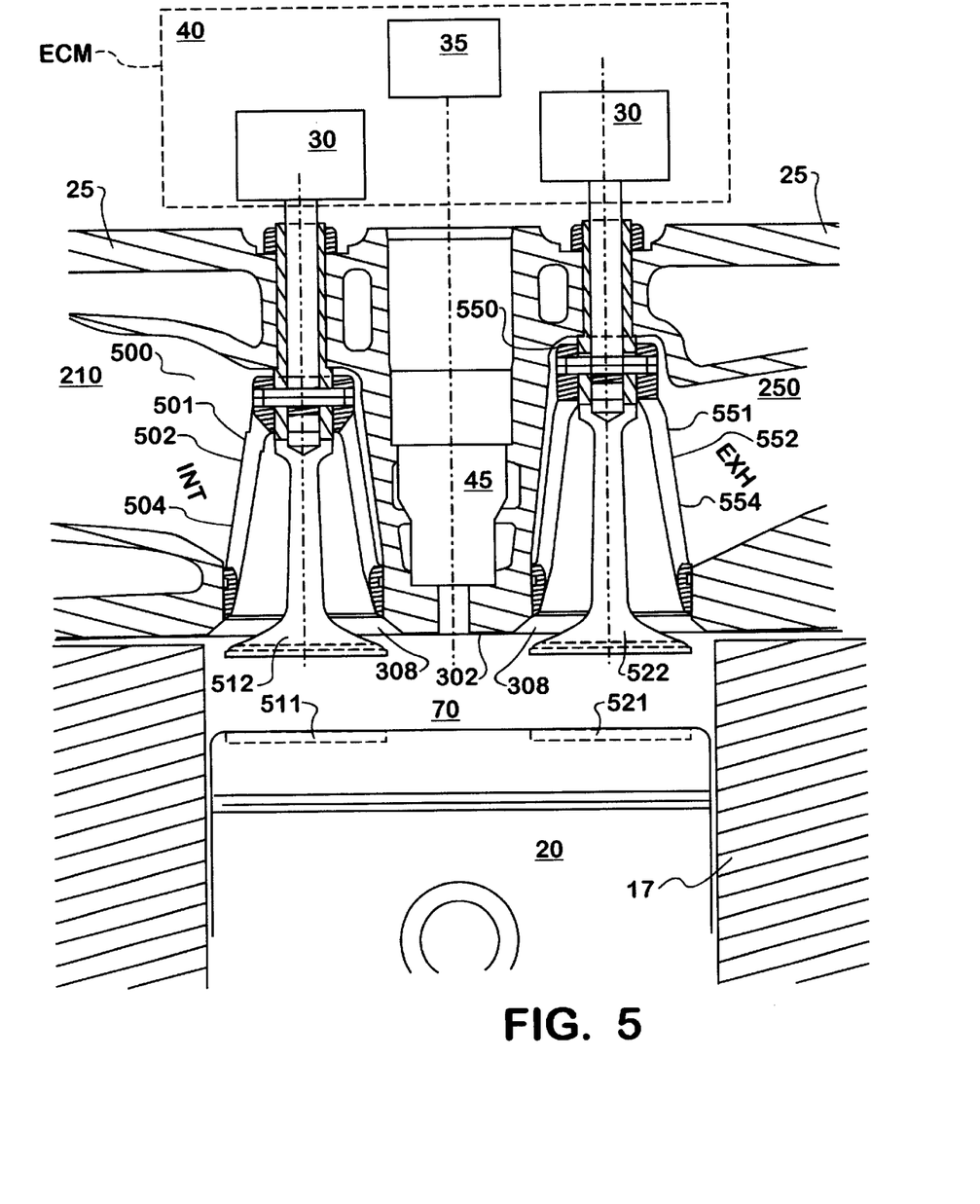
FIG. 5 illustrates a second embodiment of the retractable seat valve mechanism of the present invention.

FIG. 3A shows a moveable or retractable seat valve 300 according to an embodiment of the present invention used in the exhaust port 250. The retractable seat valve 300 is shown in a sealed or closed position, such that no gas can flow between the combustion chamber 70 and the exhaust port 250. Those of skill in the art will readily appreciate that the moveable or retractable seat valve 300 can be used on either the intake port 210 or exhaust port 250 alone, or in both gas ports 210 and 250 as shown in FIG. 5 depending on a particular application. For example, cylinder warming, cylinder deactivation, and soft shut down (both open). Further, those of skill in the art will readily recognize that there could be multiple retractable seat valves 300 where multiple intake and exhaust ports 210 and 250 are associated with a combustion chamber 70 (shown partially in FIG. 3B).

In a preferred embodiment, the moveable or retractable seat valve 300 of the present invention has a stationary seat 320 supported and mounted in the cylinder head 25 in a rigid or stationary manner so as to substantially cover the bottom exhaust port opening 255. The stationary seat 320 of the present invention is similar to existing and well known poppet valves, shown and discussed in relation to FIGS. 1 and 2.

The stationary seat 320 comprises a valve seat stem 323; a valve seat head portion 322 disposed at a bottom end of the valve stem 323; an upper tube portion 328; a valve stem top end 340; and a rigid support configuration 342 in the upper tube portion 328. The valve seat head portion 322 defines a valve seating surface 324 of a configuration and dimension sufficient for sealingly seating a retractable seat seating face 314 about the bottom exhaust port opening 255 of the exhaust port 250. In this embodiment, the valve seat head portion 322 is shown flush and vertical with respect to the cylinder head bottom 302 and does not protrude into the combustion chamber 70 (as shown for example in FIG. 5 in another embodiment). Moreover, the cylinder head 25 and the valve seat head portion 322 together form an air passage 308 around the periphery of the bottom exhaust port opening 255.

Notable, the bottom of the stationary seat 320 may also be situated in a configuration where it is recessed relative to the cylinder head bottom 302 (not shown), or protruding into the combustion chamber 70 (as shown in FIG. 5). Those of skill in the art will readily recognize that the stationary seat 320, or moveable or retractable seat valve assembly 300, could be tilted or angled vertically with respect to the cylinder head bottom 302 and the combustion chamber 70 (not shown). For example, angled or tilted intake and exhaust valves are common in gasoline engines.

The stationary seat 320 further includes a stem guide section 326. The stem guide section 326 is configured to facilitate and allow movement of a retractable seat actuator member 335 between a closed or sealed position, and an open position. FIG. 3A shows the retractable seat actuator member 335 and retractable seat 310 in a closed position.

In a preferred embodiment, the stationary seat 320 is preferably stationary and is rigidly supported by the cylinder head 25. The stationary seat 320 is rigidly supported by a valve seat retainer 329 at the top 340 of the valve seat stem 323 and the complementary cooperation of the rigid support configuration 342 with a valve seat support 332 in the cylinder head 25. Those of skill in the art will readily recognize that the stationary seat 320 can be rigidly supported in other ways.

The upper tube portion 328 of the valve seat stem 323 is configured such that the valve seat stem 323 is essential hollow from the middle 325 to the top end 340 of the stationary seat 320. The upper tube portion 328 preferably has a hollow cylinder-like shape of predetermined length and walls of a predetermined thickness. The upper tube portion 328 will preferably accept the complimentary retractable seat actuator member 335. However, the upper tube portion 328 can have other configurations that will accept a retractable seat actuator member 335, as those of skill in the art will readily recognize.

The retractable seat actuator member 335 preferably has a complimentary configuration to the upper tube portion 328 of the stationary seat 320, such that it 335 can reciprocate in relation to the stationary seat 320. The retractable seat actuator member 335 has a pin connector section 344 at its lower end. The opposing top end 350, of the retractable seat actuator member 335, is cooperatively connected to a corresponding valve actuator assembly 35 or control module 40. The pin connector section 344 will cooperatively accept a pin connector 330 that will connect the retractable seat actuator member 335 to the retractable seat 310. In this manner, the pin connector will preferably translate the movement of the retractable seat actuator member 335 to the retractable seat 310 and thereby allow selective movement of the retractable seat 310 between a closed and open position upon operation of the valve actuator assembly 35.

The moveable or retractable seat valve assembly 300 comprises a retractable seat 310. The retractable seat 310 comprises a top seat valve end 318 with a seat valve connector section 319; a middle seat valve support section 312 defining a plurality of window-like gas passages 311 (shown in FIG. 3B) around the periphery of the retractable seat 310. In an alternate embodiment, the rib support section 312 can be a helical or swirl type configuration, which will allow improved gas mixture in the combustion chamber (not shown).

The moveable or retractable seat 310 further comprises a bottom seating end 313 with a seating face 314 and a seat ring 316. The bottom seat end 313 will seal the gas passage 308, of the bottom exhaust port opening 255, when the seating face 314 is cooperatively and sealingly seated around the periphery of the valve seating surface 324 of the stationary seat 320. The seat ring 316 is preferably disposed in an exterior side of the bottom-seating end 313. The seat ring 316 is intended to seal the bottom seating end 313 of the retractable seat 310 to a head sealing portion 304 of the cylinder head 25 as the retractable seat 310 reciprocates into the cylinder head 25.

Figure 6:
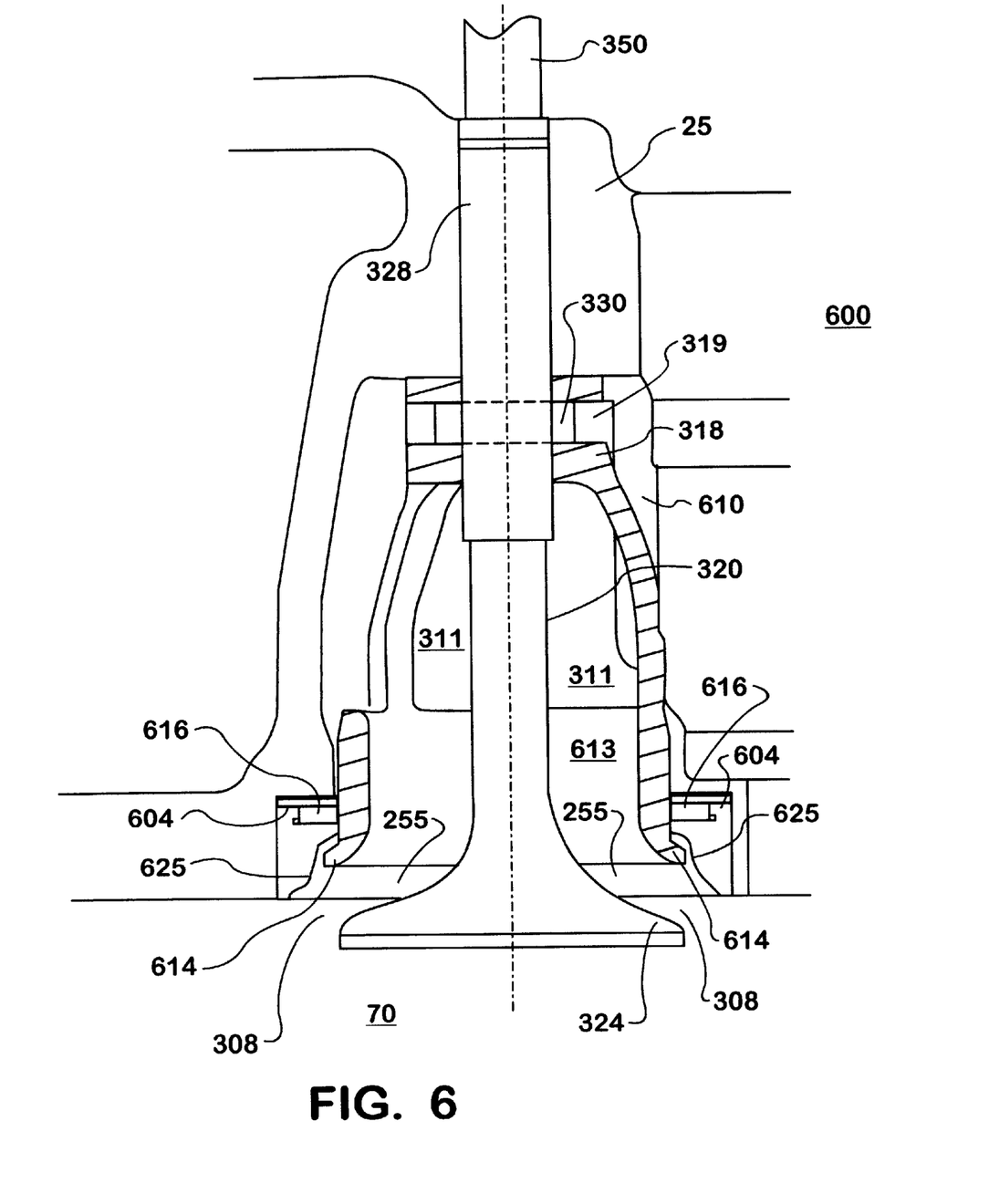
FIG. 6 illustrates a third embodiment of the retractable seat valve mechanism of the present invention.

Those of skill in the art will recognize that the seat ring 316 could instead be disposed in the head-sealing portion 304 of the cylinder head 25 (shown in FIG. 6). This configuration is advantageous, because the retractable seat 310, now without the seat ring 316, will have a lower mass. Thus, the retractable seat 310 can be moved faster while consuming or requiring less force or power to operate.

Figure 3B:
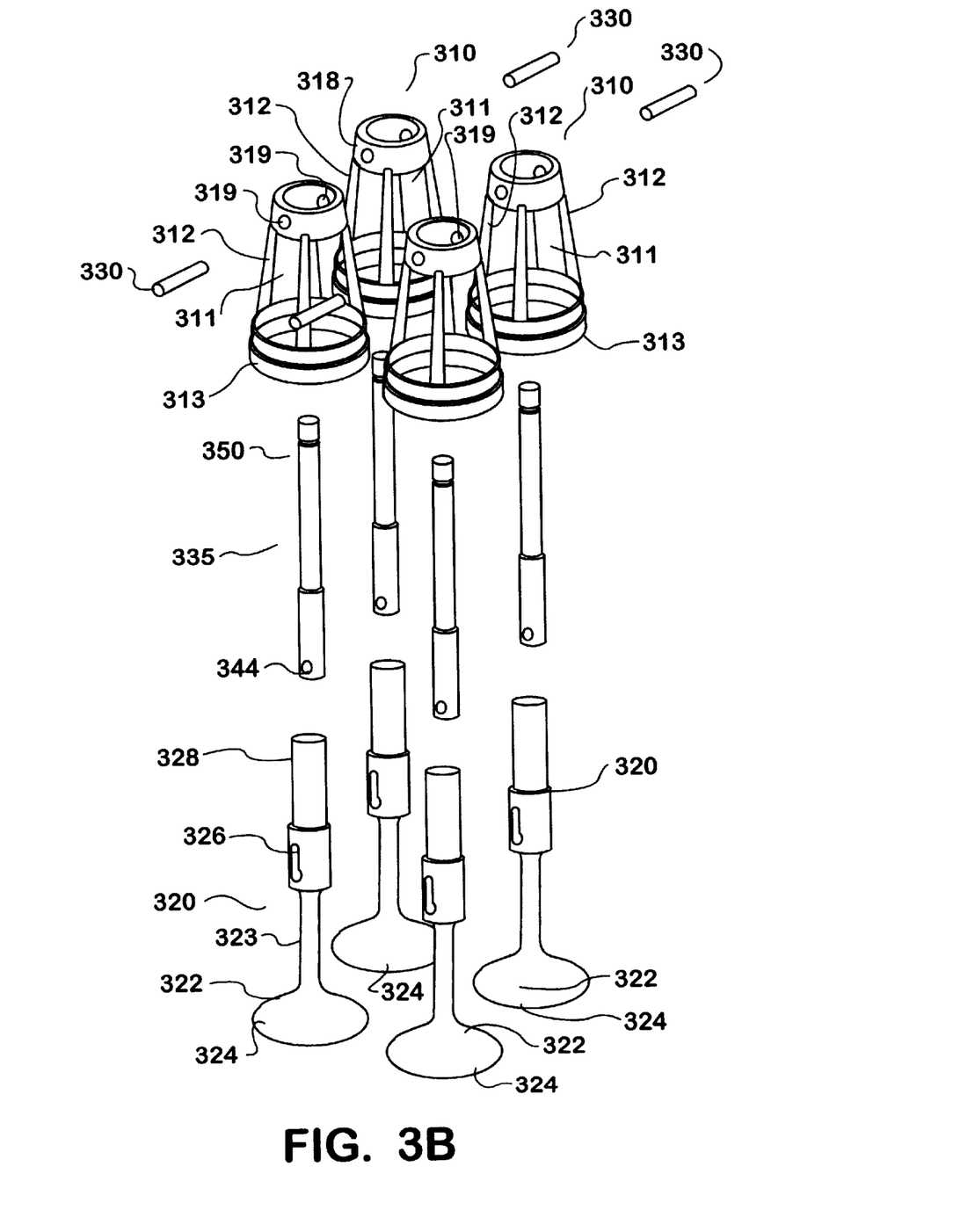
FIG. 3B illustrates a partial exploded view of a retractable seat valve mechanism similar to that shown in FIG. 3A.

FIG. 3B shows a partial exploded view of the moveable or retractable seat valve assembly 300 similar to that shown in FIG. 3A. Such a configuration could be used in an engine application that uses a pair of intake valves and a pair of exhaust valves. FIG. 3B shows preferred embodiments of the stationary seat 320, the retractable seat actuator member 335, the pin connector 330 and the retractable seat 310. The stationary seat 320 preferably comprises a valve seat stem 323 with a valve seat head portion 322, an upper tube portion 328 having a valve stem top end 340, and a stem guide section 326. The stem guide section 326 facilitates and allows movement of the retractable seat actuator member 335 therein. Further, the upper tube portion 328 preferably has a hollow cylindrical configuration from the middle 325 to the top end 340 of the stationary seat 320. The upper tube portion 328 will accept the complimentary retractable seat actuator member 335. Those of skill in the art will recognize that the upper tube portion 328 and the retractable seat actuator member 335 may have other configurations that can cooperatively engage each other such that the retractable seat actuator member 335 can reciprocate in relation to the stationary seat 320.

The retractable seat actuator member 335 preferably has a pin connector section 344 at its lower end. The opposing top end 350 will be cooperatively connected to a corresponding valve actuator assembly 35 or control module 40 (shown in FIG. 3A). The pin connector section 344 will cooperatively accept a pin connector 330 that will connect the retractable seat actuator member 335 to the retractable seat 310. In this manner, the pin connector 330 translates the movement of the retractable seat actuator member 335 to the retractable seat 310 and thereby allows selective movement of the retractable seat 310 between a closed and open position.

FIG. 3B also illustrates the retractable seat 310. The retractable seat 310 comprises a top seat end 318 with a seat connector section 319, a middle seat support section 312 defining a plurality of window-like gas passages 311 around the periphery of the retractable seat 310, and a bottom seating end 313. The rib support sections 312 and the resulting window passages 311 are shown in a substantially vertical configuration. However, the rib support sections 312 and the resulting window passages 311 can also have nonvertical configurations, such as a helical or swirl type configuration (not shown). The configuration of the rib support sections 312 and the window passages 311 allow for improved gas mixture in a corresponding combustion chamber.

Figure 4:
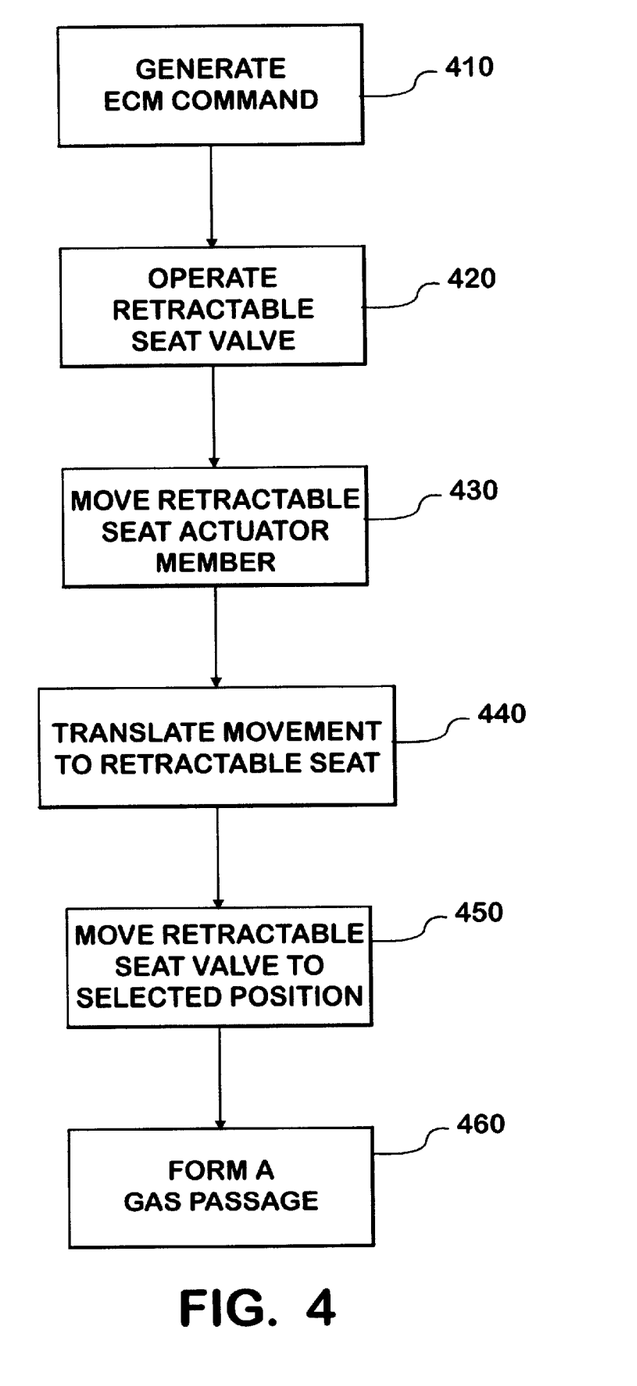
FIG. 4 illustrates a method for controlling gas flow in a combustion chamber of an internal combustion engine with the retractable seat valve according to the present invention.

FIG. 4 shows a method for controlling gas flow in a combustion chamber of an internal combustion engine according to the moveable or retractable seat valve assembly 300 of the present invention. For illustrative purposes, the method will be described in terms of opening the closed or sealed retractable seat 310 of the moveable or retractable seat valve assembly 300 (shown in FIG. 3A). Those of skill in the art will readily recognize that this method can be used to open a closed retractable seat 310 (FIG. 3A), to close an opened retractable seat valve 550 and/or 551 (FIG. 5), or to position the retractable seat valve anywhere between the closed and open positions.

In the sealed or closed position, the retractable seat seating face 314 is sealingly seated around the periphery of the valve seating surface 324. Thus, there can be no gas flow from the combustion chamber 70 to the bottom exhaust port opening 255 through the gas passage 308.

In step 410, the electronic control module (ECM) 13 generates a signal or command to actuate the moveable or retractable seat valve 300 and thereby move the retractable seat 310 to a desired position. The movement of the retractable seat 310 is selectively controlled by the ECM 13 (shown in FIG. 1) via signals to the control module 40 and more particularly to the valve actuator assembly 35 (previously discussed with reference to FIGS. 1 & 2). In a preferred embodiment, a three position three way digital control valve (not shown) will be used to actuate the moveable or retractable seat 310.

The retractable seat 310 can be selectively controlled to reciprocate in the cylinder head 25 between a closed and open position (shown in FIG. 5 for two retractable seat valves). Moreover, the retractable seat 310 can be selectively controlled to assume any desired position, including a closed position, an open position, or any intermediate position between the open and closed positions. The selectively controlled desired position of the moveable or retractable seat 310 also controls the resultant gas swirl or gas flow in the combustion chamber.

In step 420, the valve actuator assembly 35, after appropriate instructions from the ECM 13, operates and actuates the retractable seat actuator member 335. In step 430, the valve control assembly 35 moves or retracts the retractable seat actuator member 335, which is inside the upper tube portion 328 of the stationary seat 320, upward into the cylinder head 25. The retractable seat actuator member 335 reciprocates inside the upper tube portion 328 of the stationary seat 320.

In step 440, the retractable seat actuator member 335 movement is translated to the retractable seat 310 by the cooperatively connected pin connector 330. The pin connector 330 operatively connects the pin connector section 344 of the actuator member 335 to the seat valve connector section 319. In this manner, the pin connector 330 travels in the stem guide section 326 of the stationary seat 320 and its 330 movement is translated to the retractable seat 310.

In step 450, as a result of the pin connector 330 connection, the retractable seat 310 travels in the upper exhaust port section 327 to the appropriate position selected by the ECM 13. The ECM 13 can command the movable or retractable seat 310 to assume any position between the open and closed position as well as the open and closed positions.

In step 460, a gas passage 308 forms between the retractable seat seating face 314 and the valve seating surface 324 due to the movement of the retractable seat 310. When the retractable seat 310 retracts into the cylinde head 25, the seal between the retractable seat seating face 314 and the valve seating surface 324 is broken. Gas from the combustion chamber 70 can now flow to the exhaust port 250. The gas flows through the now open gas passage 308 in the bottom exhaust port opening 255, through the plurality of window-like gas passages 311 of the retractable valve rib support section 312 and on out to the exhaust port 250. The amount of gas flow out of the combustion chamber 70 is selectively controlled by partially or completely retracting the retractable seat 310 into the cylinder head 25 a predetermined distance from the valve seating surface 324.

The method just described can also be used if the retractable seat valve assembly 300 is located in an intake port, (e.g., as shown in FIG. 5). In that case, the ECM command would move the retractable seat 501 from an open position to a closed position or to a position other than a closed position. Again, the amount of gas flow into the combustion chamber 70 can be controlled by moving the retractable seat 501 to a partially or completely closed position. Those of skill in the art will readily recognize that the moveable or retractable seat valve 300 may thus be used in either an intake or exhaust port 210 and 250 or both (as shown in FIG. 5). Further, the moveable or retractable seat valve 300 may be used in any combination where there are multiple intake and exhaust ports 210 and 250 associated with a corresponding combustion chamber 70 (shown in FIGS. 3A and 7).

FIG. 5 shows an embodiment where the moveable or retractable seat valve assembly 500 and 550 of the present invention is used in both the intake and exhaust ports 210 and 250. A first moveable or retractable seat valve 500 is associated with intake port 210, while a second moveable or retractable seat valve 550 is associated with the exhaust port 250. Both retractable seat valve assemblies 500 and 550 are shown in an open position. The embodiment of FIG. 5 further shows that the retractable seat valve assemblies 500 and 550 have their respective first and second valve seat head portions 512 and 522 protruding into the combustion chamber 70 by a predetermined and fixed distance from the cylinder head bottom 302. The distance that the first and second valve seat head portions 512 and 522 protrude into the combustion chamber 70 can be the same or different depending on particular engine parameters needed or desired.

FIG. 5 also shows an associated piston 20 with first and second piston pockets 511 and 521. The first and second piston pockets 511 and 521 accommodate the first and second valve seat head portions 512 and 522 which protrude into the combustion chamber 70. The first and second piston pockets 511 and 521 have a configuration such that the piston pockets 511 and 521 are "filled" by the protruding valve seat head portions 512 and 522 as the piston 20 travels to the top dead center (TDC) position during its cycle. The complimentary cooperation of the piston pockets 511 and 521 and the protruding valve seat heads 512 and 522 prevent "dead volume" in the combustion chamber 70 which can adversely affect combustion and thus engine performance.

Those of skill in the art will readily recognize that the protruding valve seats 501 and 551, and the retractable seat valve assemblies 500 and 550, can be tilted or angled away from a vertical position with respect to the cylinder head bottom 302 and the combustion chamber 70. The first and second piston pockets 511 and 521 would then be configured to correspond to the tilted or angled protruding valve seats 501 and 551, and the retractable seat valve assemblies 500 and 550.

Both retractable seat valve assemblies 500 and 550 operate, as described with reference to FIG. 4, to allow selective control of gas flow and/or gas swirl in the combustion chamber 70. When the first retractable seat valve assembly 500 operates, gas will flow via the intake port 210, through the first rib support section 502 window-like passages 504, around the periphery of the protruding first valve seat head portion 512, through the gas passage 308, and into the combustion chamber 70. During operation of the second retractable seat valve assembly 550, gas will flow from the combustion chamber 70, through the gas passage 308 around the periphery of the protruding second valve seat head portion 522, through the second rib support section 552 window-like passages 554, and on to the exhaust port 250.

The amount of gas flow into or out of the combustion chamber 70 is selectively controlled, via the ECM 13, by partially or completely retracting the first and/or second retractable seats 501 and 551 into the cylinder head 25. As mentioned previously, the moveable or retractable seats 501 and 551 are operable regardless of the position of the associated piston 20. This is the case since there is no possibility of retracting seat-to-piston contact.

FIG. 6 illustrates a third embodiment of the moveable or retractable seat valve mechanism 600 of the present invention. In particular, the moveable or retractable seat valve mechanism 600 has a preferred configuration of the bottom seating end or skirt 613 of the retractable seat 610 (similar to that shown in FIGS. 3A and 5) and a corresponding bottom port opening configuration 625 of the cylinder head 25. Otherwise, the moveable or retractable seat valve mechanism 600 preferably operates in the same manner as that described with respect to FIG. 4.

The retractable seat 610 preferably comprises a bottom seating end or skirt 613 with a curved or flared seating face 614. The cylinder head 25 preferably comprises a corresponding curved bottom port opening configuration 625 such that the bottom seating end 613 of the retractable seat valve 610 can travel in the bottom port opening 255 during actuation of the moveable or retractable seat valve mechanism 600. The complimentary curved or flared configurations of the bottom seating end 613 and the bottom port opening 625 will tend to further promote gas swirl in the corresponding combustion chamber 70. FIG. 6 also shows a sealing ring 616 preferably mounted in the cylinder head sealing portion 604 of the cylinder head 25. In this configuration, the moveable or retractable seat 610 will have a lower mass. The moveable or retractable seat 610 can, as a result, be actuated more rapidly with less force and power. The bottom seat end 613 will seal the gas passage 308 of the port opening 255 when the curved face 614 is cooperatively seated around the periphery of the valve seating surface 324 of the stationary seat 320. The sealing ring 616, disposed in the cylinder head sealing portion 604, will seal the bottom seating end 613 of the moveable or retractable seat 610 as the moveable or retractable seat 610 reciprocates in the cylinder head 25 between a closed and open position.

Figure 7:
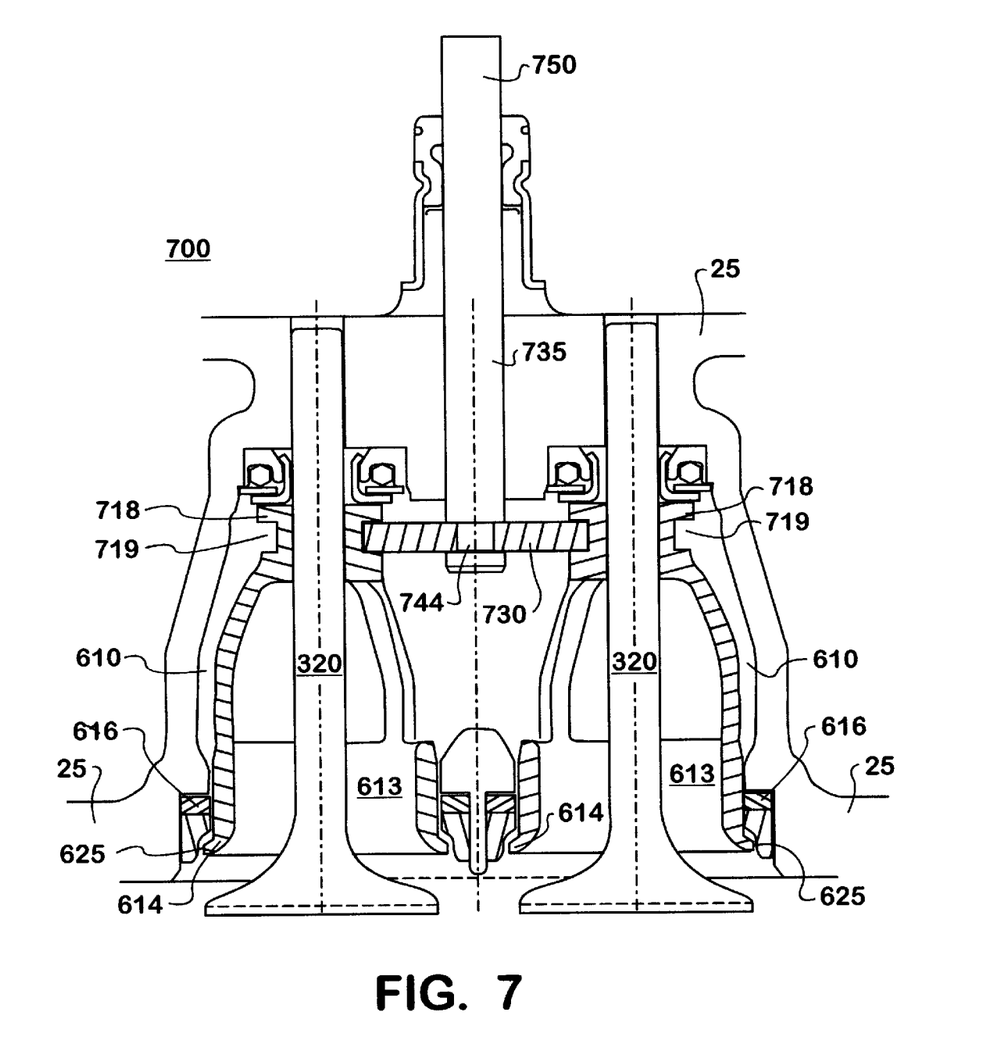
FIG. 7 illustrates a fourth embodiment of the retractable seat valve mechanism of the present invention.

FIG. 7 shows a fourth embodiment of the moveable or retractable seat valve 700 of the present invention having a pair or tandem retractable seat 610 configuration. The pair configuration 700 comprises a pair of retractable seats 710 which can be simultaneously actuated by a single retractable seat actuator member 735 via a valve bridge or connecting bridge 730.

The retractable seat actuator member 735 is appropriately mounted or positioned between the stationary seats 620 in the cylinder head 25. The retractable seat actuator member 735 preferably has a solid cylindrical rod shape, but need only have a cooperative configuration to the area of the cylinder head 25 that surrounds it such that it 735 can reciprocate in the cylinder head 25. The retractable seat actuator member 735 has a bridge connector section 744 at its lower end. The opposing top end 750, of the retractable seat actuator member 735, will be cooperatively connected to a corresponding valve actuator assembly 35 or control module 40 (shown in FIGS. 3A and 5).

The bridge connector section 744 will cooperatively accept a valve bridge 730 that connects the retractable seat actuator member 735 to a seat valve connection section 719 in a top seat valve end 718 of the retractable seats 610. In this manner, the valve bridge 730 can translate movement of the retractable seat actuator member 735 simultaneously to the retractable seats 610 allowing selective movement between a closed and open position upon operation of a valve actuator assembly 35 (shown in FIGS. 3A & 5).

FIG. 7 also shows that, as shown in FIG. 6, the retractable seat 610 comprises a bottom seating end or skirt 613 with a curved seating face 614 while the cylinder head 25 comprises a complementary curved bottom port opening configuration 625. Further, in this embodiment, the sealing ring 616 is mounted in the cylinder head sealing portion 604 of the cylinder head 25. The tandem or pair moveable or retractable seats 610 of FIG. 7 operate in the same manner as described in the discussions of FIGS. 3A and 5.

The present invention has been described and illustrated by way of certain examples of preferred embodiments relating to an internal combustion engine only. It is noted that the present invention may be used on any type of internal combustion engine, e.g., a diesel or gasoline, that requires the flow of gas into and/or out of a combustion chamber. Further, the retractable seat valve of the present invention is scalable and thus readily adaptable to internal combustions engines of various bore sizes. Also, the retractable seat valve is applicable in internal combustion engine applications that use diesel or gasoline as the primary fuel, or other alternative fuels, e.g. propane, methanol, compressed natural gas (CNG), etc. Additional advantages will be readily apparent to those skilled in the art, who may modify the described embodiments without departing from the true spirit and scope of the invention. Therefore, this invention is not limited to the specific details, representative devices, and illustrated examples in this description. The present invention is limited only by the following claims and equivalents.

I claim:

1. A retractable seat valve for use in an internal combustion engine, said retractable seat valve comprising:
   a retractable seat;
   a stationary seat;
   a retractable seat actuator member; and
   a pin connector for cooperatively coupling the retractable seat to the retractable seat actuator member and stationary seat;
   whereby the retractable seat is selectively actuated and positioned in a cylinder head to control gas flow in a combustion chamber.

2. The retractable seat valve of claim 1, wherein the retractable seat valve has an orientation that is perpendicular or angled in relation to a cylinder head combustion deck.

3. The retractable seat valve of claim 2, wherein the stationary seat protrudes into a corresponding combustion chamber.

4. The retractable seat valve of claim 3, wherein the retractable seat valve is operable with a corresponding piston in the combustion chamber with a piston pocket to accommodate the protruding stationary seat.

5. The retractable seat valve of claim 1, wherein the retractable seat comprises a rib support section.

6. The retractable seat valve of claim 5, wherein the rib support section is a helical configuration.

7. The retractable seat valve of claim 1, wherein the retractable seat further comprises a bottom seating end having a sealing ring that sealingly engages a head sealing portion.

8. The retractable seat valve of claim 1, wherein the head sealing portion comprises a sealing ring that sealingly engages a bottom seating end of the retractable seat.

9. The retractable seat valve of claim 1, wherein the internal combustion engine is a diesel or gasoline engine.

10. The retractable seat valve of claim 1, wherein the retractable seat valve is actuated by selectively positioning the retractable seat actuator member via a valve actuator assembly.

11. The retractable seat valve of claim 1, wherein the retractable seat can assume an open position, a sealed position or a position therebetween.

12. The retractable seat valve of claim 1, wherein the retractable seat further comprises a curved bottom seating end that sealingly engages a head sealing portion.

13. A retractable seat valve for use in a cylinder head in an internal combustion engine, said retractable seat valve comprising:
   a retractable seat;
   a stationary seat;
   a retractable seat actuator member;
   a pin connector for cooperatively coupling the retractable seat to the retractable seat actuator member and stationary seat; and
   a valve actuator assembly able to selectively actuate and position the retractable seat actuator member;
   whereby the retractable seat is actuated by the valve actuator assembly to selectively control gas flow in a combustion chamber.

14. The retractable seat valve of claim 13, wherein the retractable seat valve has an orientation that is perpendicular or angled in relation to a cylinder head combustion deck.

15. The retractable seat valve of claim 14, wherein the stationary seat protrudes into a corresponding combustion chamber.

16. The retractable seat valve of claim 15, wherein the retractable seat valve is operable with a corresponding piston in the combustion chamber with a piston pocket to accommodate the protruding stationary seat.

17. The retractable seat valve of claim 13, wherein the retractable seat comprises a rib support section.

18. The retractable seat valve of claim 17, wherein the rib support section is a helical configuration.

19. The retractable seat valve of claim 13, wherein the retractable seat further comprises a bottom seating end having a sealing ring that sealingly engages a head sealing portion.

20. The retractable seat valve of claim 13, wherein the head sealing portion comprises a sealing ring that sealingly engages a bottom seating end of the retractable seat.

21. The retractable seat valve of claim 13, wherein the internal combustion engine is a diesel or gasoline engine.

22. The retractable seat valve of claim 13, wherein the retractable seat can assume an open position, a sealed position or a position therebetween.

23. A retractable seat for cooperative use with a stationary seat in a cylinder head of an internal combustion engine, said retractable seat comprising:
   a top retractable seat end having a seat valve connector section for cooperative connection to a retractable seat actuator member and a stem guide section of a stationary seat;
   a bottom seating end comprising a retractable seat seating face able to seal an opening passage in cooperation with a valve seating surface; and
   a retractable seat rib support section defining a plurality of flow passages between the top retractable seat end and the retractable seat seating surface;
   whereby the retractable seat can be selectively actuated and positioned in the cylinder head, via controlled movement of the retractable seat actuator member, thereby allowing controlled gas flow in a combustion chamber.

24. A valve seat for cooperative use with a retractable seat in a cylinder head of an internal combustion engine, the valve seat comprising:
   a stationary seat head portion having a stationary valve seating surface able to seal an opening passage in cooperation with a retractable seat seating face;
   an upper tube portion configured to accept a retractable seat actuator member; a stem guide section, in the upper tube section, able to allow movement therein of the retractable seat actuator member and a pin connector; and
   a valve stem top able to cooperate with a valve seat retainer whereby the valve seat is stationary relative to the cylinder head.

25. The valve seat of claim 24, further comprising a rigid support configuration able to cooperate with a valve seat support in a cylinder head.

26. A retractable seat valve for controlling gas flow in a combustion chamber of an internal combustion engine having a cylinder head, a gas port, and a gas port opening into said combustion chamber, the retractable seat valve comprising:
   a stationary seat disposed adjacent said gas port opening to the combustion chamber, the stationary seat comprising a stationary seat head portion extending across the gas port opening and having a peripheral valve seating surface; and a retractable seat moveably disposed in the gas port for selectively controlled movement therein;

whereby the retractable seat is disposed in a cooperative relationship to the valve seating surface of the stationary seat to thereby control gas flow in the combustion chamber.

27. The retractable seat valve of claim 26, wherein the retractable seat valve has an orientation that is perpendicular or angled in relation to a cylinder head combustion deck.

28. The retractable seat valve of claim 27, wherein the stationary seat protrudes into a corresponding combustion chamber.

29. The retractable seat valve of claim 28, wherein the retractable seat valve is operable with a corresponding piston in the combustion chamber with a piston pocket to accommodate the protruding stationary seat.

30. The retractable seat valve of claim 26, wherein the retractable seat comprises a rib support section.

31. The retractable seat valve of claim 30, wherein the rib support section is a helical configuration.

32. The retractable seat valve of claim 26, wherein the retractable seat further comprises a bottom seating end having a sealing ring that sealingly engages a head sealing portion.

33. The retractable seat valve of claim 26, wherein the head sealing portion comprises a sealing ring that sealingly engages a bottom seating end of the retractable seat.

34. The retractable seat valve of claim 26, wherein the internal combustion engine is a diesel or gasoline engine.

35. The retractable seat valve of claim 26, wherein the retractable seat can assume an open position, a sealed position or a position therebetween.

36. The retractable seat valve of claim 26, wherein the retractable seat comprises a curved bottom seating end that sealingly engages a head sealing portion.

37. A retractable seat valve for use in an internal combustion engine, said retractable seat valve comprising:

at least one retractable seat;

at least one stationary seat;

a retractable seat actuator member; and a valve bridge for cooperatively coupling the retractable seat actuator member, the at least one retractable seat and the at least one stationary seat;

whereby the at least one retractable seat are selectively and simultaneously actuated and positioned in a cylinder head to control gas flow in a combustion chamber.

38. The retractable seat valve of claim 37, wherein the at least one retractable seat valve has an orientation that is perpendicular or angled in relation to a cylinder head combustion deck.

39. The retractable seat valve of claim 38, wherein the at least one stationary seat protrudes into a corresponding combustion chamber.

40. The retractable seat valve of claim 39, wherein the retractable seat valve is operable with a corresponding piston in the combustion chamber with a piston pocket to accommodate the protruding stationary seat.

41. The retractable seat valve of claim 37, wherein the at least one retractable seat comprises a rib support section.

42. The retractable seat valve of claim 41, wherein the rib support section is a helical configuration.

43. The retractable seat valve of claim 37, wherein the at least one retractable seat further comprises a bottom seating end having a sealing ring that sealingly engages a corresponding and complimentary head sealing portion.

44. The retractable seat valve of claim 37, wherein a head sealing portion comprises a sealing ring that sealingly engages a bottom seating end of the at least one retractable seat.

45. The retractable seat valve of claim 37, wherein the internal combustion engine is a diesel or gasoline engine.

46. The retractable seat valve of claim 37, wherein the retractable seat valve is actuated by selectively positioning the retractable seat actuator member via a valve actuator assembly.

47. The retractable seat valve of claim 37, wherein the at least one retractable seat can assume an open position, a sealed position or a position therebetween.

48. The retractable seat valve of claim 37, wherein the at least one retractable seat further comprises a curved bottom seating end that sealingly engages a corresponding and complimentary head sealing portion.

49. A method of controlling gas flow in a combustion chamber of an internal combustion engine, the method comprising the steps of:

actuating a retractable seat valve to thereby selectively position a retractable seat actuator member in an upper tube portion;

translating the retractable seat actuator member movement to a retractable seat;

positioning the retractable seat to a desired position; and forming a gas passage solely by retracting the retractable seat into a port.

50. The method of controlling gas flow of claim 49, wherein the desired position of the retractable seat is a closed position, an open position, or an intermediate position therebetween.

51. A method of controlling gas flow in a combustion chamber of an internal combustion engine, the method comprising the steps of:

generating a command to actuate a retractable seat valve from an electronic control module;

operating a valve actuator assembly;

moving a retractable seat actuator member in an upper tube portion;

translating the retractable seat actuator member movement to a retractable seat via a pin connector;

moving the retractable seat to a desired position; and forming thereby a gas passage between a retractable seat seating face and a stationary valve seating surface;

whereby gas can flow in a controlled manner to or from the combustion chamber.

52. The method of controlling gas flow of claim 35, wherein the desired position of the retractable seat is a closed position, an open position, or an intermediate position therebetween.

53. A method of controlling gas flow in a combustion chamber of an internal combustion engine, the method comprising the steps of:

actuating, in response to at least an electronic command, a first valve actuator assembly to operate at least one intake retractable seat during an intake cycle resulting in gas flow into a combustion chamber; and actuating a second valve actuator to operate at least one exhaust retractable seat during an exhaust cycle resulting in gas flow out of the combustion chamber.

* * * * *